May 2, 1939. M. CAMPBELL 2,156,581
COMBINATION FARM MACHINE
Filed Feb. 16, 1938 4 Sheets-Sheet 1
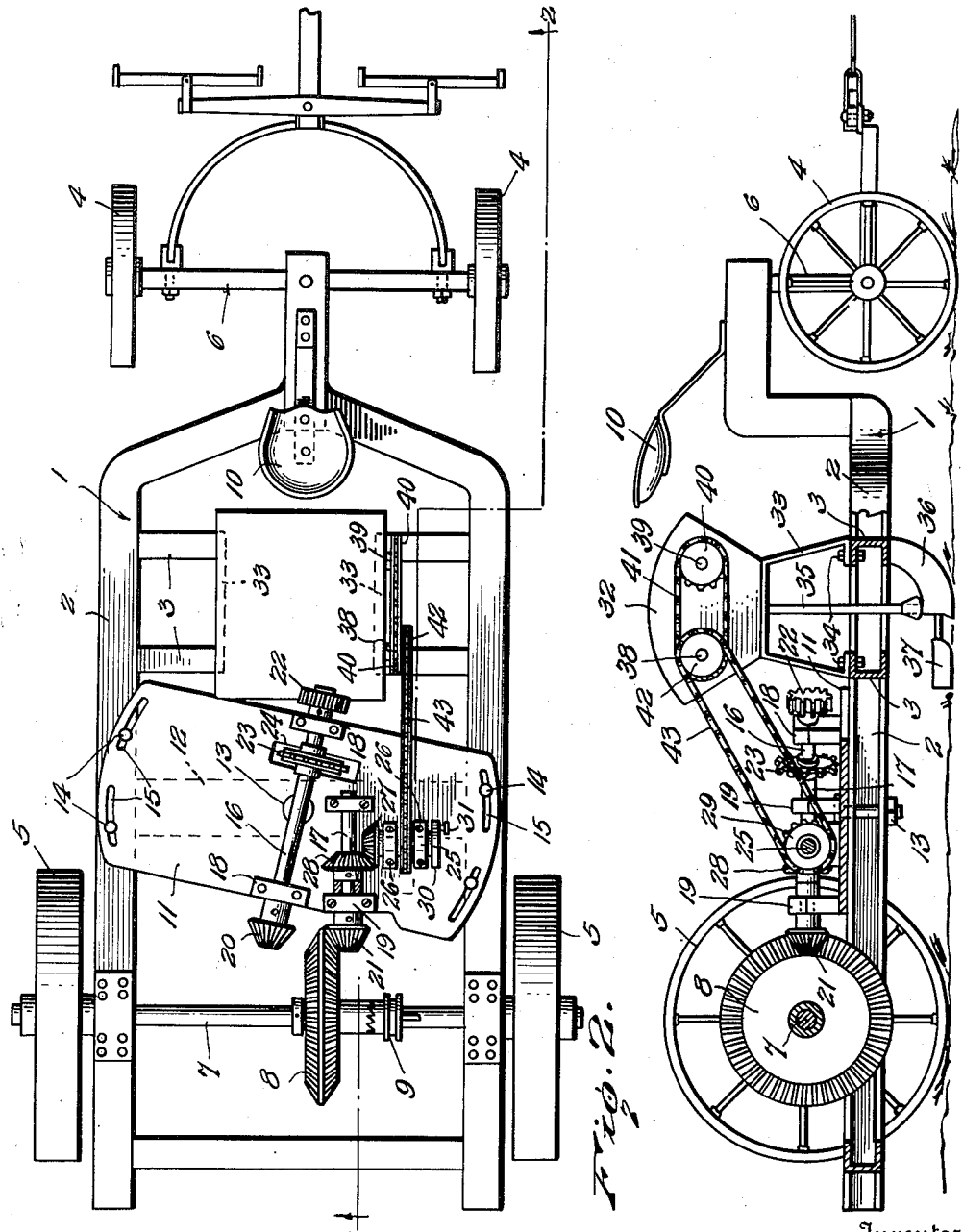
Inventor
Monterey Campbell.
By Lacey & Lacey, Attorneys

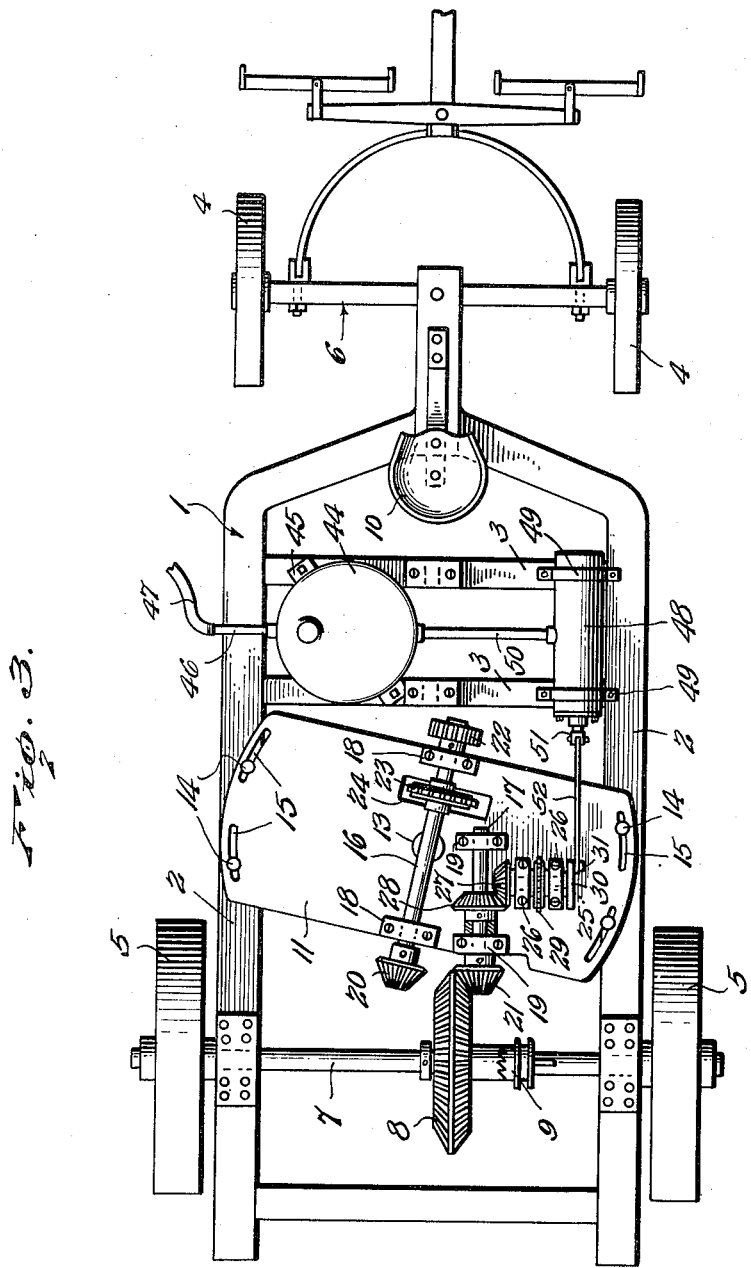

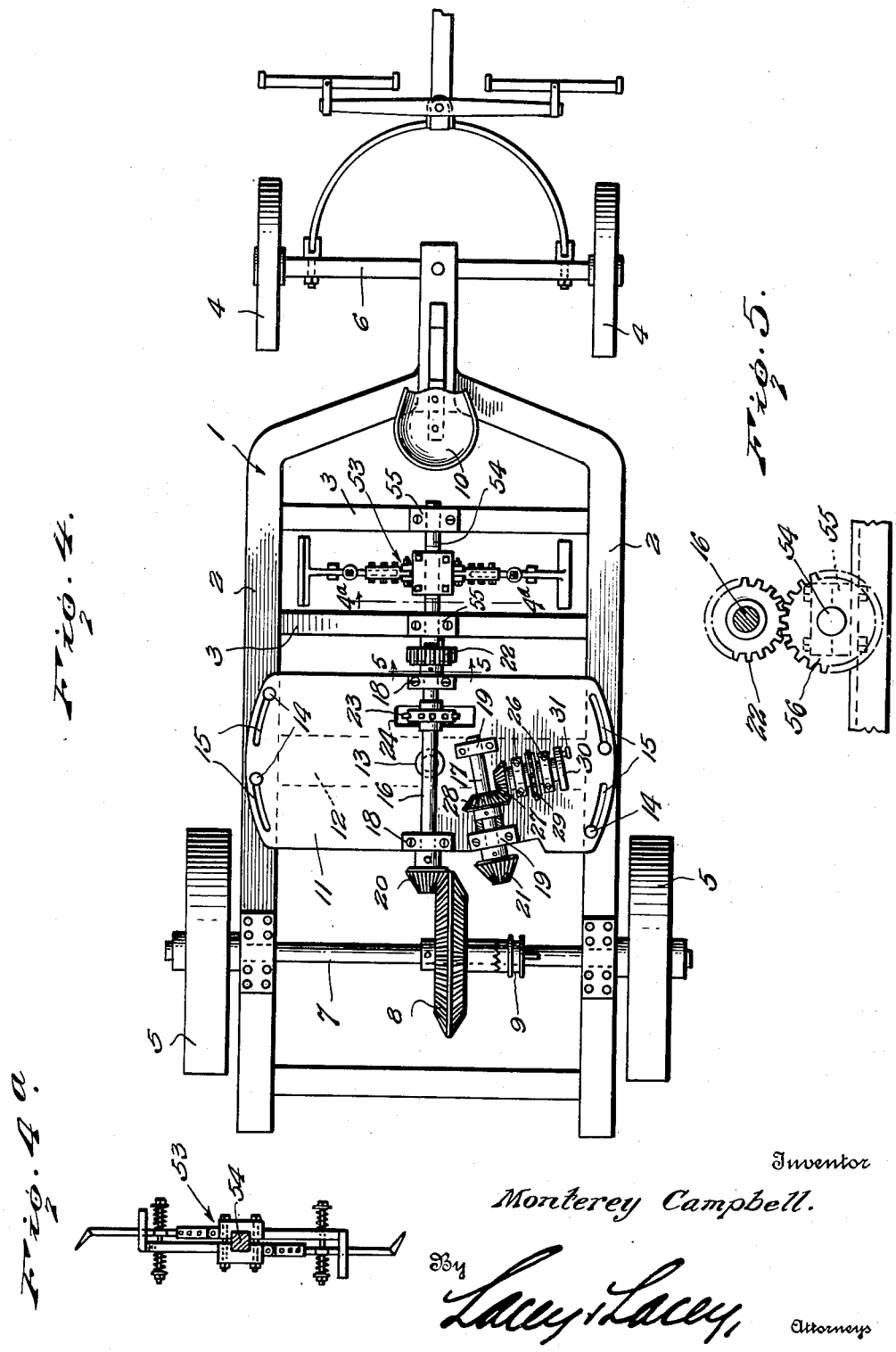

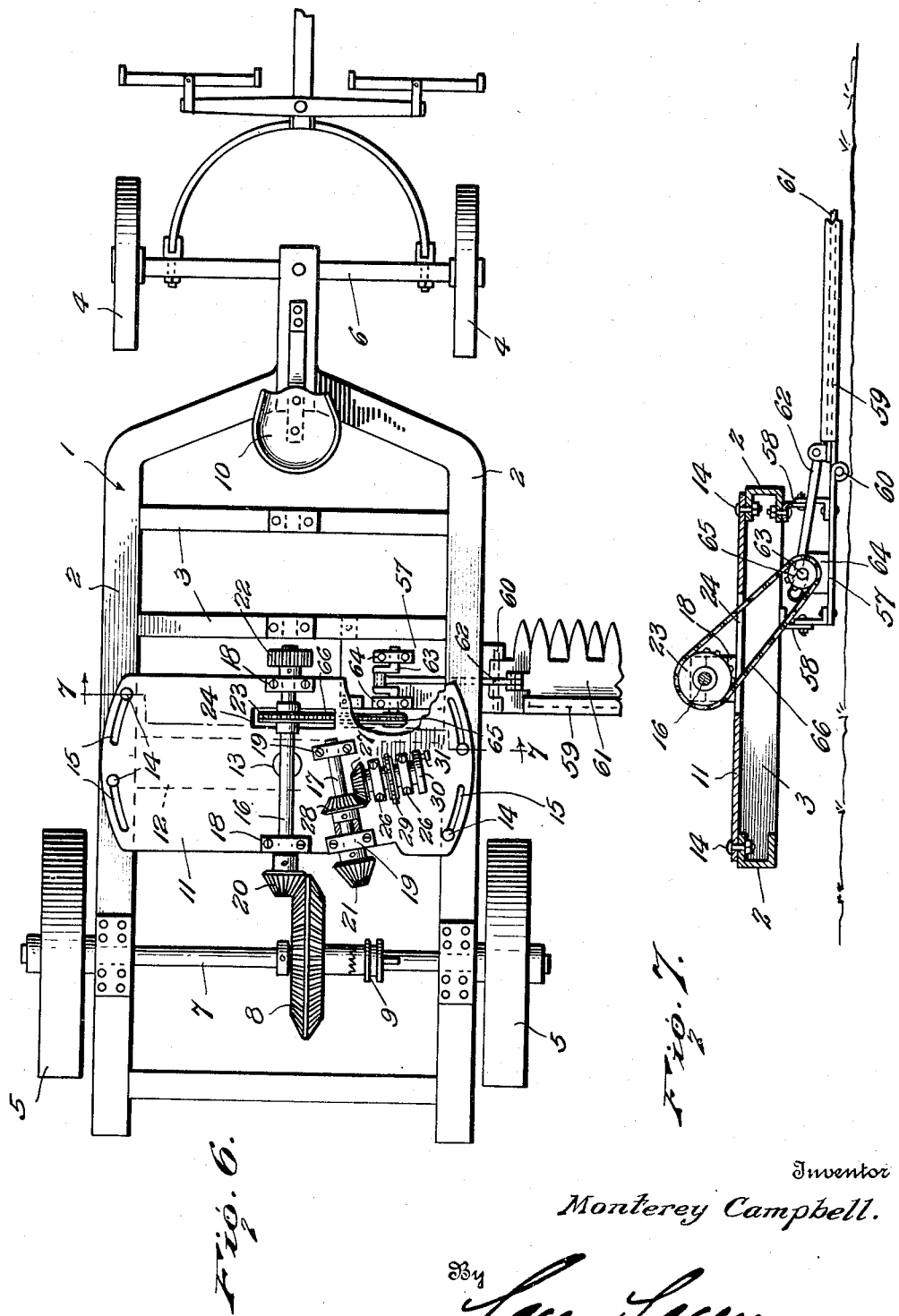

Patented May 2, 1939

2,156,581

UNITED STATES PATENT OFFICE 2,156,581

COMBINATION FARM MACHINE

Monterey Campbell, Sanford, N. C.

Application February 16, 1938, Serial No. 190,848

6 Claims. (Cl. 74—11)

This invention relates to an agricultural implement or combination farm machine, and it is one object of the invention to provide a farm machine by means of which a large number of farming operations may be carried out and thus eliminate the necessity of a farmer purchasing or hiring special machines each of which is intended for only one use during the preparation of the soil or growth and harvesting of a crop.

Another object of the invention is to provide a farming machine including a frame or portable body adapted to have a plurality of attachments individually applied thereto according to the use to which the machine is to be put, thus permitting the desired apparatus to be selectively applied to the frame of the machine when needed and easily removed and stored in a barn or other sheltered place in a comparatively small space when not in use. It will thus be seen that with this improved combination machine a farmer may have on hand ready to use implements needed at various times during the growing of a crop but will not have to buy a complete machine for each use. This reduces machinery cost upon a farm as only a single wheeled frame need be purchased and a suitable number of attachments which are to be applied to the frame when needed.

Another object of the invention is to provide a combination farm machine including a wheeled frame and a special transmission mechanism carried by a platform or support which is adjustably mounted upon the frame and adapted to be shifted from one position to another according to the type of apparatus applied to the frame.

Another object of the invention is to provide in a farm machine of this character an improved transmission including an adjustably mounted base or platform carried by the frame of the machine and carrying a plurality of shafts so arranged that by turning the platform about a pivot pin or king bolt gears carried by the shafts may be selectively brought into mesh with a gear carried by the rear axle of the machine which serves as a main drive shaft when the machine is in use.

The invention is illustrated in the accompanying drawings, wherein

Figure 1 is a top plan view of the improved farm machine when used as a drill for planting grain or other seed, Figure 2 is a sectional view taken along the line 2—2 of Figure 1, Figure 3 is a top plan view of the farm machine showing the seed drill mechanism removed and a spraying device mounted upon the frame, Figure 4 is a top plan view of the farm machine showing a cotton chopper applied thereto in place of the seed drill or spraying device, the transmission being adjusted in order that the shaft for imparting movement to the cotton chopper will have geared connection with the main drive shaft or rear axle and the transmission shaft for the seed drill and sprayer moved out of geared connection with the main shaft, Figure 4ᵃ is a view taken along the line 4ᵃ—4ᵃ of Figure 4 showing the chopper in elevation, Figure 5 is a fragmentary sectional view taken along the line 5—5 of Figure 4 and illustrating the manner in which rotary motion is transmitted from the transmission shaft to the cotton chopper shaft, Figure 6 is a top plan view showing the cotton chopper removed and a mowing apparatus applied to the machine and operatively connected with the transmission shaft by a sprocket chain, and Figure 7 is a sectional view taken transversely through Figure 6 along the line 7—7.

This combination farm machine has a body or frame 1 which may be of any desired length and width and provided with side bars 2, between which extend cross bars 3. Front and rear wheels 4 and 5 are provided, the front wheels being carried by a truck 6 of a conventional construction to which draft mechanism is applied for use with horses, as shown, or with a tractor in case a tractor is to be used instead of draft animals. The rear wheels 5 are carried by the rear axle 7 which is rotatably mounted transversely of the frame and constitutes the main drive shaft of the machine. A large beveled gear 8 of the double type is carried by the axle or drive shaft 7 and there has also been provided a conventional clutch 9 by adjustment of which turning of the gear 8 with the drive shaft or rear axle may be controlled. This clutch may be provided with any desired conventional type of adjusting mechanism in order that the driver of the machine who occupies the seat 10 may control turning of the gear 8 with the drive shaft.

The transmission which constitutes a very important portion of this improved farm machine is carried by the frame and has a base plate or platform 11 which rests upon the frame and is supported by the side bars 2 and a cross bar 12 extending between the side bars. A pivot pin or king bolt 13 extends through the platform and the cross bar at centers thereof to pivotally mount the platform or base plate, and in order to limit turning movement of the base plate, there has been provided bolts 14 carried by the side bars 2 and extending through arcuate slots 15 formed in end portions of the platform transversely thereof. It will thus be seen that, while the platform or base plate may be turned about the pivot pin when adjustments of the transmission are desired, its turning movement will be limited. The base plate or platform 11 carries transmission shafts 16 and 17 which are rotatably mounted in bearings 18 and 19. These shafts project rearwardly from the base plate and carry beveled gears 20 and 21, and by comparing Figures 1 and 3 with Figures 4 and 6, it will be seen that either the beveled gear or pinion 21 may be brought into mesh with the double gear 8, as shown in Figures 1 and 3, or the gear or pinion 20 may be engaged with the gear 8, as shown in Figures 4 and 6. This is accomplished by turning the base plate about its pivot pin, and it will be readily understood that by so adjusting the base plate rotary motion may be selectively transmitted to either the shaft 16 or the shaft 17. A gear 22 is carried by the forward end portion of the shaft 16 which projects beyond the platform or base plate, and this shaft also carries a sprocket wheel 23 disposed over an opening 24 formed in the base plate. In addition to the shafts 16 and 17, there has also been provided a driven shaft 25 which extends transversely of the shaft 17 and is rotatably mounted in bearings 26. This shaft 25 carries a beveled gear 27 meshing with a beveled gear 28 which is fixed upon the shaft 17 so that, when the shaft 17 is rotated by engagement of its beveled gear 21 with the gear 8, rotary motion will be transmitted to the shaft 25. Between the bearings 26 the shaft 25 carries a sprocket wheel 29 and at the opposite end of the shaft 25 from the beveled gear 27 there is mounted a disk 30 provided near its periphery with an outwardly extending pin 31. The mechanism so far described constitutes the main body portion or carriage of the farming machine and the transmission mechanism which is carried by the body and adjustably mounted in order that the shafts 16 and 17 may be selectively rotated.

In Figures 1 and 2, the farm machine has been shown rigged for use as a drill, by means of which seed and fertilizer are deposited in the ground. During such use of the machine, a hopper 32 is disposed over the main frame of the machine and its depending supporting legs 33 secured at their lower ends upon the cross bars 3 by bolts 34. It is to be understood that the hopper may be of any dimensions desired. The hopper is partitioned in the usual manner to provide front and rear compartments into which seed and fertilizer are placed and suitable feeding mechanism provided in each compartment so that the feed and fertilizer will be delivered from the compartment into a spout 35 extending downwardly and terminating in operative relation to a furrow opener 36 which is of a conventional construction and removably secured to the under face of the front cross bar 3. A covering device 37 is also provided for closing the furrow and covering the seed after it has been deposited in the furrow. The feeding means in the two compartments of the hopper have drive shafts 38 and 39 projecting to an end wall of the hopper and carrying sprocket wheels 40 about which a sprocket chain 41 is engaged in order that rotary motion may be transmitted from the shaft 38 to the shaft 39. The shaft 38 also carries a sprocket wheel 42 for engagement by a sprocket chain 43 which is engaged about the sprocket wheel 29, and it will be readily understood that as the farm machine is drawn forwardly across a field with the gear 21 in mesh with the gear 8 the shafts 17 and 25 will be rotated and rotary motion transmitted to the shafts 38 and 39 of the feeding mechanism. Any number of spouts 35 may be provided according to the size of the hopper used and a furrow opener and cover will be provided for each spout. Any other specific type of planter adapted to be mounted upon the cross bars 3 and driven by a sprocket chain engaged about the sprocket wheel 29 may be used in place of the one shown. After the planting is finished the hopper and the furrow opener and seed covering mechanism may be removed and stored in a small space in a barn or other shelter where they will be protected from exposure to weather.

In Figure 3, the farm machine has been shown equipped with a sprayer. When the machine is so used, a tank 44 is removably secured upon the cross bars 3 by removable fasteners passed through attaching feet 45 or in any other desired manner. This tank or container is to be filled with a poisonous liquid, such as Paris green, or any suitable insecticide through the medium of which insects and fungous growth which attack a particular crop may be destroyed. This tank has a discharge spout 46 from which extends a tube 47, and it will be understood that the tube 47 may be of any desired length and carry a spraying nozzle or the like at its free end. Air pressure is to be employed for forcing the liquid from the tank through the spout 46 and tube 47, and in order to build up an air pressure in the tank, there has been provided a pump 48 which is removably secured adjacent one side of the main frame of the machine by clamps 49. This pump communicates with the tank 44 through the medium of a pipe 50 and when the pump is operated air will be forced into the tank and build up an air pressure which will force the liquid from the tank. The pump is of the piston type and in order to impart reciprocating movement to its piston rod 51 a pitman 52 is employed which has one end pivoted to the outer end of the piston rod and its other end engaged about the pin 31 of the disk 30. During rotation of the shaft 25, the pitman will impart reciprocating movement to the piston rod and the pump will be actuated. It will thus be seen that, when the platform or base plate 11 is in the position shown in Figures 1, 2 and 3, rotary motion will be imparted to the shafts 17 and 25 and the farm machine may be used as a grain drill, sprayer or as other implements which may be actuated through the medium of a sprocket chain leading from the sprocket wheel 29 or by a pitman applied to the pin 31 of the disk 30.

When the farm machine is to be used as a cotton chopper, the bolts 14 are loosened and the base plate or platform 11 turned about its pivot 13 from the position shown in Figures 1, 2 and 3 to the position shown in Figures 4 and 6, and the beveled gear 20 moved into engagement with the gear 8 while the gear 21 moves out of engagement with the gear 8. This cotton chopper, which is indicated in general by the numeral 53, is disposed between the cross bars 3 with its shaft 54 rotatably mounted in bearings 55 which are detachably secured upon the cross bars. The shaft 54 projects rearwardly beyond the rear cross bar 3 and at its rear end carries a gear 56 which meshes with the gear 22 when the base plate is in the position shown in Figure 4 with the shaft 16 extending longitudinally of the frame 1 in axial alinement therewith. As the machine is drawn forwardly across a field, the shaft 16 will be rotated and the intermeshing gears 22 and 56 will cause rotary motion to be imparted to the shaft 54. The cotton chopper will thus be set in motion and operate in the usual manner. Any other farm implement capable of being driven from the gear 22 may be substituted in place of the cotton chopper.

When the base plate 11 is in the position shown in Figures 4 and 6, the farm machine may be rigged for service as a mowing machine, and such an arrangement of parts is shown in Figure 6 and in Figure 7. Referring to these figures, it will be seen that a support 57 has been mounted under the frame and suspended by brackets 58 which are detachably secured to the rear cross bar and one of the side bars 2 of the frame. A cutter bar 59 extends outwardly from the support 57 to which it is hingedly secured, as shown at 60, and this cutter bar carries a reciprocating blade 61, such as used upon all mowing machines of a conventional construction. A cutter bar and blade of a standard size used for cutting hay may be employed or a large cutter bar and blade may be used if silage corn or other thick and tough vegetation is to be cut. The usual pitman 62 is provided for imparting reciprocating movement to the cutter blade 61, and this pitman extends inwardly over the support with its inner end engaged with the crank of a crank shaft 63 mounted in bearings 64 carried by the support 57. The crank shaft carries at its rear end a sprocket wheel 65 for engagement by a sprocket chain 66 and this chain extends upwardly through the opening 24 in the platform or base plate 11 for engagement about the sprocket wheel 23 carried by the shaft 16. The farm machine when so equipped may be driven forwardly and during this forward movement reciprocating motion will be transmitted to the cutter blade and the hay or other vegetable will be cut in the usual manner.

When all of the attachments specifically mentioned are removed, other attachments may be applied, such as a hay rake, which would be mounted at the rear of the main frame and detachably secured to the rear cross bar or rear ends of the side bars 2 of the main frame. Instead of a hay rake, a harrow may be mounted under the main frame in advance of the rear wheels and detachably secured to the main frame. Instead of a harrow, a scraping blade and mounting mechanism therefor may be applied with the blade extending transversely of the frame in advance of its rear wheel and this farm machine then used for road grading or for terracing land to prevent soil from being washed away. An arrangement of cultivator blades or plows may also be applied to the frame. It will thus be seen that there has been provided a farm machine having general utility from the time the soil is prepared for planting to the harvesting of a crop. Due to the fact that a single wheeled frame is used and the attachments applied when needed, a farmer need not purchase a large number of expensive machines which are only occasionally used. This not only reduces the cost of machinery but also reduces the amount of space necessary for storage purposes and a farmer will, at small cost, have ready for use machinery needed.

Having thus described the invention, what is claimed as new is:

1. In a combination machine, a frame, a driving shaft rotatably carried by said frame, a gear carried by said drive shaft, a support shiftably carried by said frame, driven shafts rotatably carried by said support, gears carried by said driven shafts and disposed at opposite sides of the gear of the main shaft, means to releasably secure said support in a shifted position with a gear of a selected one of the driven shafts meshing with the gear of the main shaft, and means for transmitting motion from the selected driven shaft to an implement carried by said frame.

2. In a combination farm machine, a mobile frame adapted to have implements selectively mounted thereon, a main shaft rotatably carried by said frame, a main gear carried by the main shaft, a support carried by said frame and adapted to be shifted from one position to another, rotary driven shafts carried by said support and provided with gears disposed at opposite sides of the main gear for individual engagement therewith when the support is moved from one position of adjustment to another, and means for transmitting motion from the selected driven shaft to implements selectively applied to the frame.

3. A combination farming implement comprising a mobile frame, a main shaft rotatably carried by said frame, a main gear carried by said shaft and having opposed side faces formed with teeth, a support carried by said frame and pivotally mounted for swinging adjustment about a vertical axis, driven shafts rotatably carried by said support and disposed at opposite sides of the main gear and provided with gears for meshing with teeth of the main gear, means for releasably securing said support in an adjusted position with the gear of a selected driven shaft meshing with teeth at the confronting side of the main gear, and means for transmitting motion from the selected driven shaft to implements selectively applied to said frame.

4. A combination farm machine comprising a mobile frame adapted to have a plurality of farming implements selectively applied thereto and detachably secured, a main shaft rotatably carried by said frame, a double gear carried by said main shaft, a support resting upon said frame in advance of said shaft and its gear, a pivot mounting said support for turning adjustment about a vertical axis, said support having arcuate slots in its end portion, fasteners carried by said frame and extending through the slot of said support and constituting means for limiting turning movement of the support about its pivot and securing the support in an adjusted position, driven shafts rotatably carried by said support and extending longitudinally of the frame at opposite sides of said double gear, gears carried by said driven shafts for individually meshing with the double gear and imparting rotary motion to the selected driven shaft when said support is turned about its axis to an adjusted position for disposing the gear of a predetermined driven shaft in mesh with the double gear of the drive shaft, and means for transmitting motion from the selected driven shaft to implements applied to the frame.

5. A combination farm machine comprising a mobile frame having side bars and cross bars extending between the side bars, a main shaft rotatably mounted transversely of said frame and provided with a gear, a mounting plate resting upon said frame between the cross bars and the drive shaft and its gear and pivotally mounted for turning adjustment about a vertical axis intermediate the width of the frame, driven shafts rotatably mounted upon said supporting plate and extending longitudinally of said frame at opposite sides of the gear of said drive shaft, gears carried by the rear ends of said driven shafts for individually meshing with the gear of the drive shaft when the supporting plate is turned about its axis to adjusted positions, and a gear carried by the forward end of one of the driven shafts for transmitting rotary motion to an implement when the said implement is mounted upon the cross bars and the supporting plate disposed in a position of adjustment effecting engagement of the gear at the rear end of the last-mentioned driven shaft with the gear of the drive shaft.

6. A combination farm machine comprising a mobile frame adapted to have a plurality of implements selectively applied thereto and detachably secured, a main shaft rotatably carried by said frame, a main gear carried by said shaft, a supporting plate resting upon said frame in advance of the main shaft and its gear and pivotally mounted for turning adjustment about a vertical axis, a driven shaft rotatably mounted above said plate and extending longitudinally of the frame with its rear end portion projecting from the plate and its forward end portion also projecting from the plate, gears carried by the front and rear end portions of said shaft, the rear gear being adapted to mesh with the main gear when the plate is moved to one position of adjustment, a sprocket wheel carried by said driven shaft and disposed over an opening in the plate, a second driven shaft rotatably mounted above said plate longitudinally of the frame and having a gear at its rear end for meshing with the main gear when the plate is in another position of its adjustment, and a shaft rotatably mounted above the plate transversely of the second driven shaft and in geared connection therewith.

MONTEREY CAMPBELL.